US009041338B2

(12) United States Patent
Shen et al.

(10) Patent No.: US 9,041,338 B2
(45) Date of Patent: May 26, 2015

(54) PORTABLE SOLAR POWER SUPPLY

(71) Applicant: Hugee Technology Co., Ltd., New Taipei (TW)

(72) Inventors: Hung Pin Shen, Tainan (TW); Lung Hua Wu, Hualien (TW); Yen Ling Chen, Kaohsiung (TW)

(73) Assignee: HUGEE TECHNOLOGY CO., LTD., New Taipei (TW)

( * ) Notice: Subject to any disclaimer, the term of this patent is extended or adjusted under 35 U.S.C. 154(b) by 375 days.

(21) Appl. No.: 13/684,269

(22) Filed: Nov. 23, 2012

(65) Prior Publication Data

US 2013/0134921 A1    May 30, 2013

(51) Int. Cl.
    *H02J 7/00*     (2006.01)
    *H02J 7/35*     (2006.01)

(52) U.S. Cl.
    CPC ............ *H02J 7/0052* (2013.01); *H02J 7/0029* (2013.01); *H02J 7/35* (2013.01); *H02J 7/355* (2013.01); *H02J 2007/0001* (2013.01)

(58) Field of Classification Search
    CPC ............ H02J 7/35; H02J 7/355; Y02E 60/12; Y02E 10/50; H01M 10/465; H01M 16/006; H01L 31/0508; H01L 31/042; H01L 31/0504
    USPC ........................................................ 320/101
    See application file for complete search history.

(56) References Cited

U.S. PATENT DOCUMENTS

| 4,141,425 | A  | * | 2/1979  | Treat ............................. 180/2.2 |
| 4,209,735 | A  | * | 6/1980  | Yoshida ........................ 320/101 |
| 5,012,220 | A  | * | 4/1991  | Miller .......................... 340/7.32 |
| 5,025,202 | A  | * | 6/1991  | Ishii et al. ..................... 320/101 |
| 5,811,958 | A  | * | 9/1998  | Yamamoto ..................... 320/101 |
| 6,184,654 | B1 | * | 2/2001  | Bachner et al. ............... 320/114 |
| 6,977,479 | B2 | * | 12/2005 | Hsu ............................... 320/101 |
| 8,288,028 | B2 | * | 10/2012 | Batra ............................. 429/99 |
| 2008/0061739 | A1 | * | 3/2008 | Lu ................................ 320/114 |
| 2009/0284216 | A1 | * | 11/2009 | Bessa et al. ................... 320/101 |
| 2011/0074334 | A1 | * | 3/2011 | Wang et al. ................... 320/101 |

* cited by examiner

*Primary Examiner* — Arun Williams
(74) *Attorney, Agent, or Firm* — Jackson IPG PLLC

(57) ABSTRACT

A portable solar power supply includes a solar-powered charger including a solar cell; a circuit board including a power management unit, a buck-boost converter unit, a charging control unit, a data management unit, an on/off switch, a set of indicators, a power inlet, a power outlet, a first connector, a wireless communications member, a line transmission member, a data storage member, an RFID member, an SD card member, a USB port, a Micro USB port, and a solar charging member; and holes; and a rechargeable battery including at least one electrochemical cell each shaped to partially contain the solar-powered charger and including a second connector, a third connector, snapping members, and slots. The second connector is capable of connecting to the first connector or the third connector, and the snapping members are capable of being retained in the holes or the slots.

6 Claims, 6 Drawing Sheets

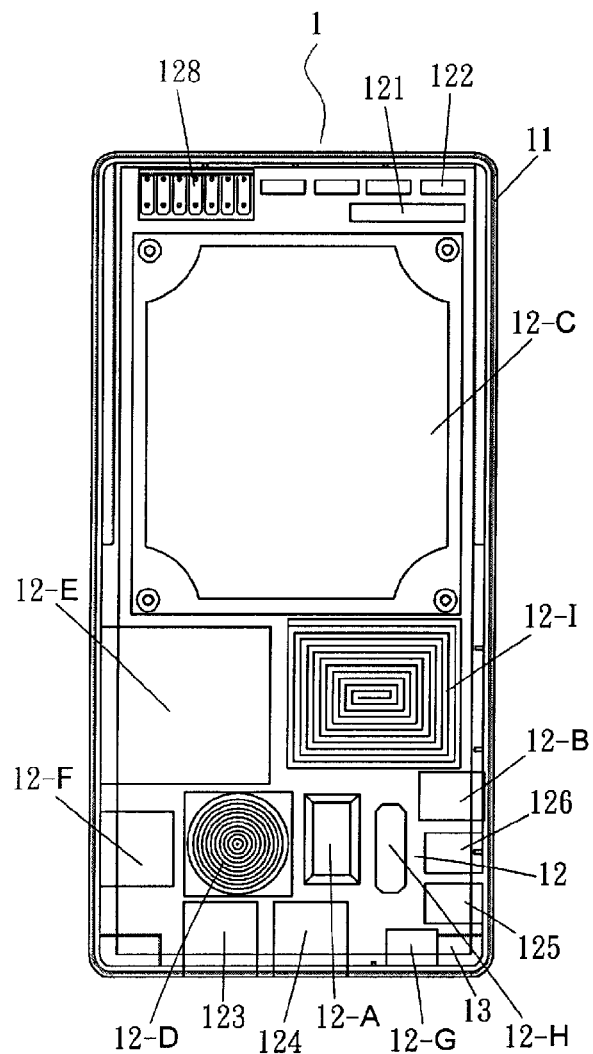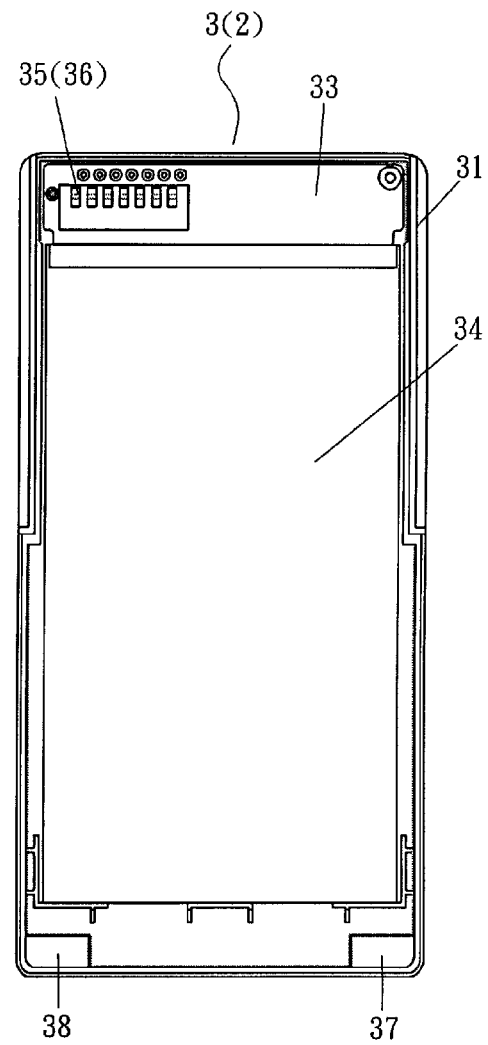
Fig. 1
Fig. 2

US 9,041,338 B2

PORTABLE SOLAR POWER SUPPLY

CROSS-REFERENCE TO RELATED APPLICATIONS

The subject matter of this application is related to U.S. patent application Ser. No. 13/344,857 filed Jan. 6, 2012, the teachings of which are incorporated herein by reference in their entirety.

BACKGROUND OF THE INVENTION

1. Field of the Invention

The invention relates to power supplies and more particularly to a portable solar power supply having a solar-powered charger and a rechargeable battery with one or more electrochemical cells.

2. Description of Related Art

Currently, a rechargeable battery is a common power source for various portable consumer electronic products, such as mobile phones, laptops, digital cameras, music players, etc. For charging the rechargeable battery, a specific charger is required to convert AC power from an outlet into DC and supply same thereto. When external power is inaccessible, charging is impossible. And in turn, the electronic device employing the rechargeable battery as a power source is inoperative when the battery is low.

For solving this problem, many types of portable solar power supply (so called "power pack") have been developed. By using a portable solar power supply, a user can charge his/her electronic device anywhere he/she goes when such need arises.

Conventionally, a portable solar power supply is comprised of a rechargeable battery and a control circuit that are disposed in a housing. The commercial portable solar power supplies are provided with different battery capacities. While a portable solar power supply having a small capacity is usually compact and light in weight, its operating time is limited. To the contrary, a portable solar power supply having a large capacity can serve for a relatively long period of time but it is bulky and less portable. In addition, life time of the conventional rechargeable batteries is subject to frequency of use. Further, once the typical battery becomes poor in performance or is broken, the whole power supply is no longer usable.

Thus, the need for improvement still exists.

SUMMARY OF THE INVENTION

It is therefore one object of the invention to provide a portable solar power supply comprising a solar-powered charger comprising a solar cell; a circuit board including a power management unit, a buck-boost converter unit, a charging control unit, a data management unit, an on/off switch, a set of indicators, a power inlet, a power outlet, a first connector, a wireless communications member, a line transmission member, a data storage member, an RFID member, an SD card member, a USB port, a Micro USB port, and a solar charging member; and a plurality of holes; and a rechargeable battery comprising at least one electrochemical cell each shaped to partially contain the solar-powered charger and including a second connector, a third connector, a plurality of snapping members, and a plurality of slots; wherein the second connector is capable of connecting to either the first connector or the third connector, and the snapping members are capable of being retained in either the holes or the slots.

The above and other objects, features and advantages of the invention will become apparent from the following detailed description taken with the accompanying drawings.

BRIEF DESCRIPTION OF THE DRAWINGS

FIG. 1 is a top view of a solar-powered charger of a portable solar power supply according to the invention with a solar cell removed;

FIG. 2 is a top view of one of a plurality of cells of a rechargeable battery of the solar power supply;

DETAILED DESCRIPTION OF THE INVENTION

Figure 3:
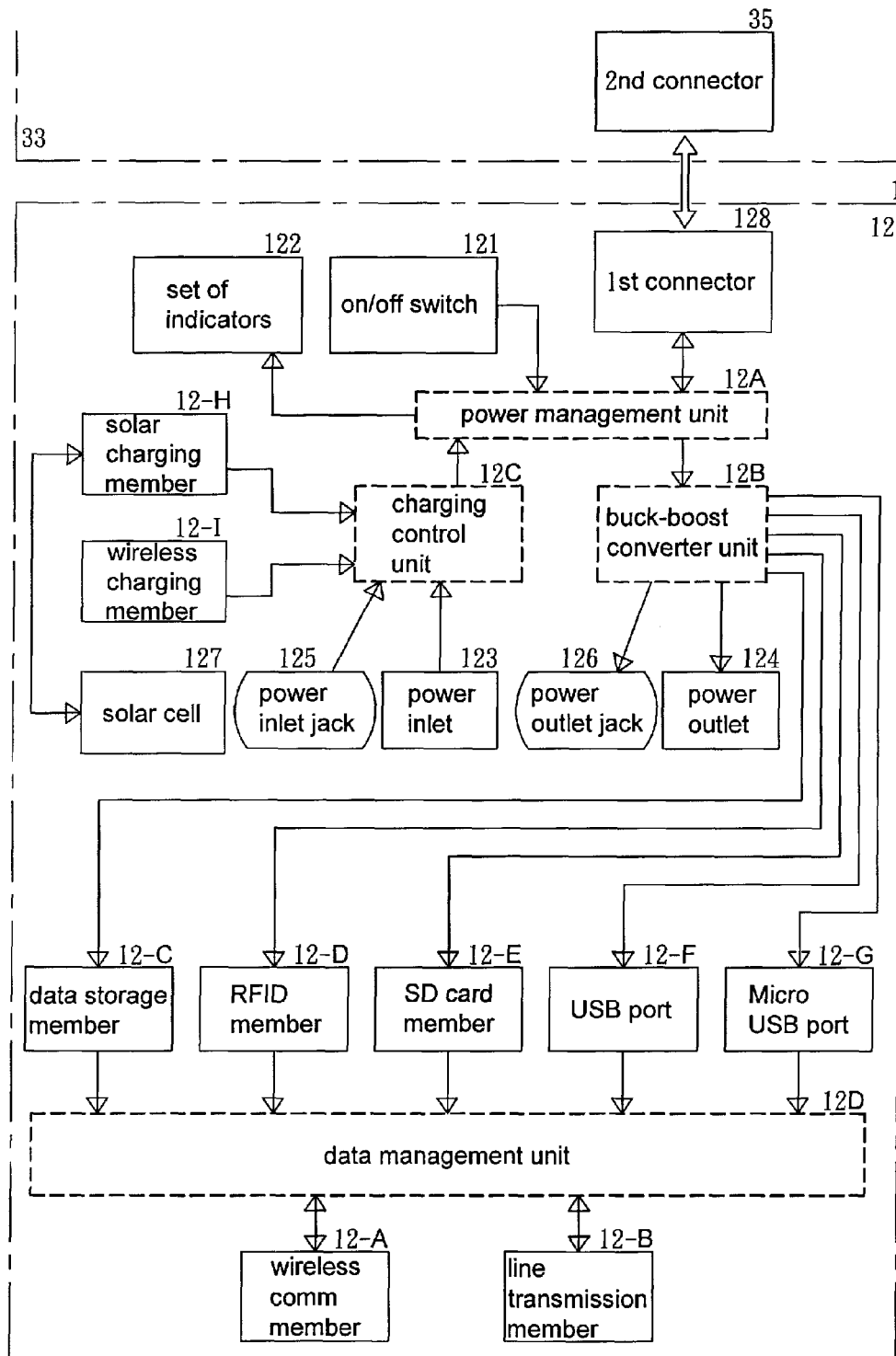
FIG. 3 is a block diagram of a circuit board of the solar-powered charger of FIG. 1 and a second connector of a control member of the cell of FIG. 2.
Figure 4:
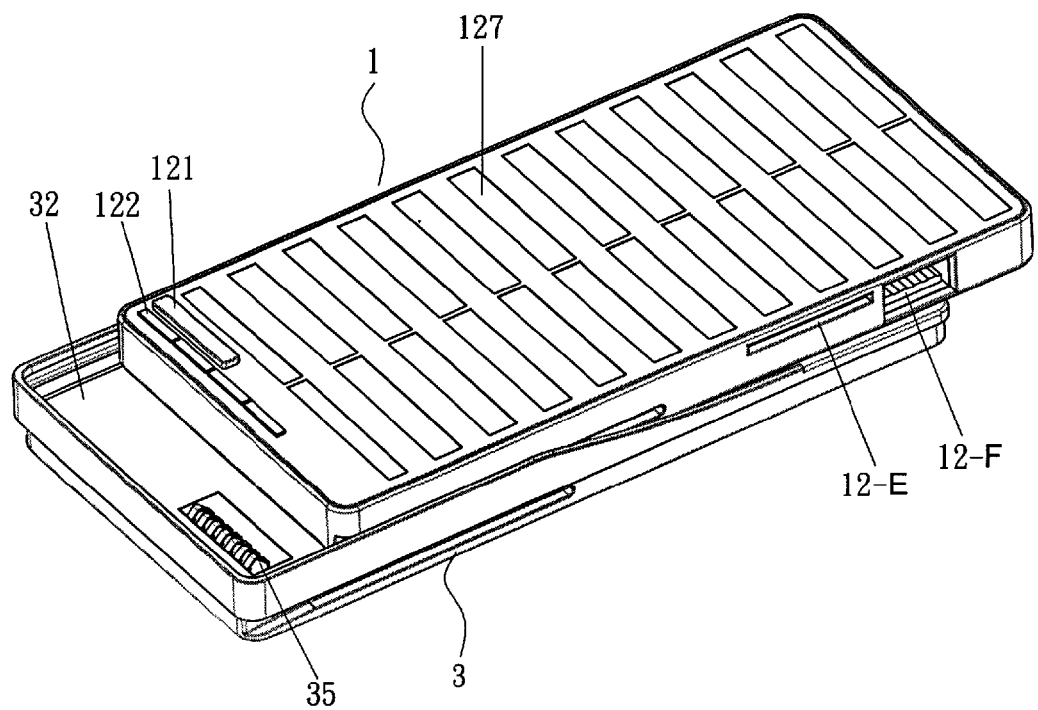
FIG. 4 is a perspective view of the solar-powered charger and the cell being partially assembled.
Figure 5:
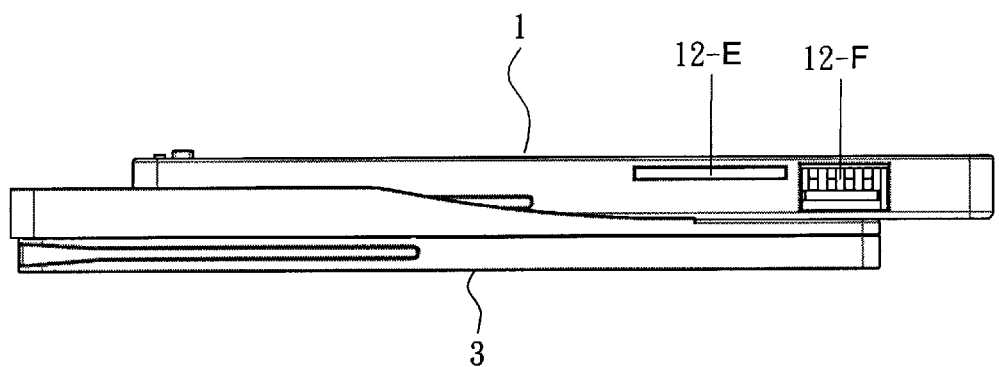
FIG. 5 is a side elevation of FIG. 4.
Figure 6:
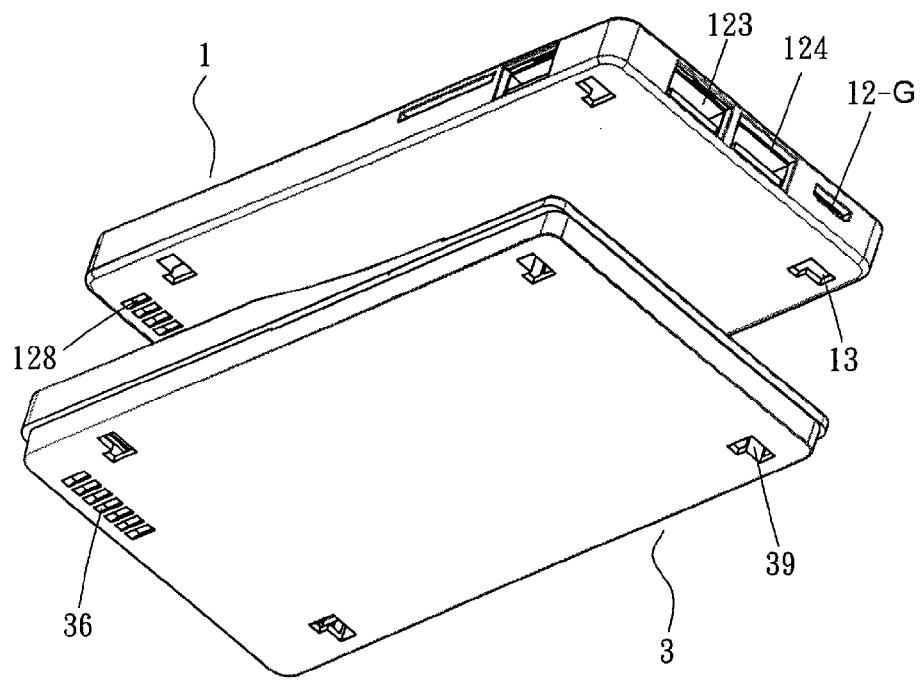
FIGS. 6 and 7 are exploded, perspective views of FIG. 4 viewing from different angles respectively.
Figure 7:
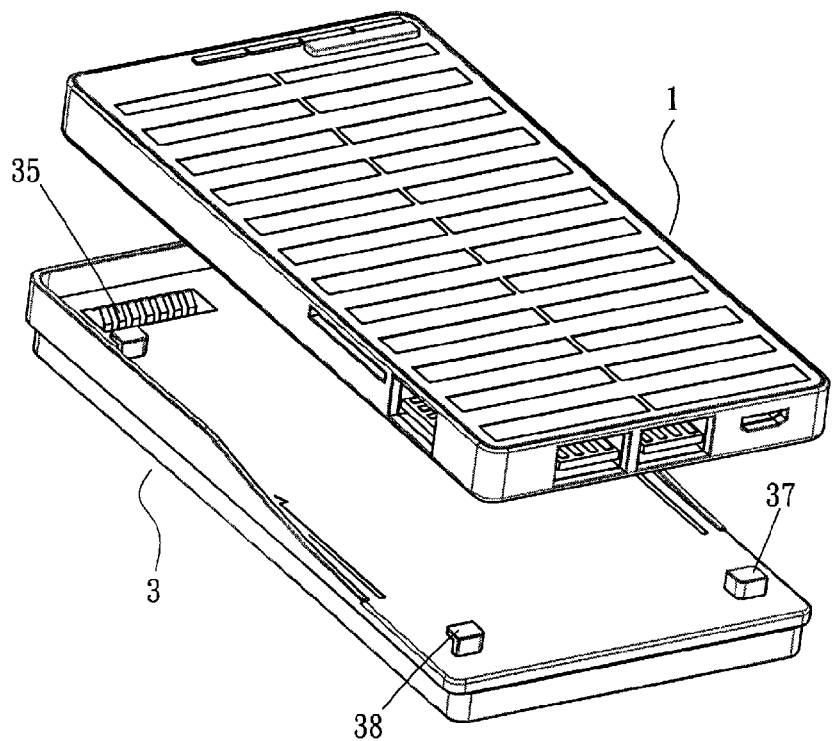
Figure 8:
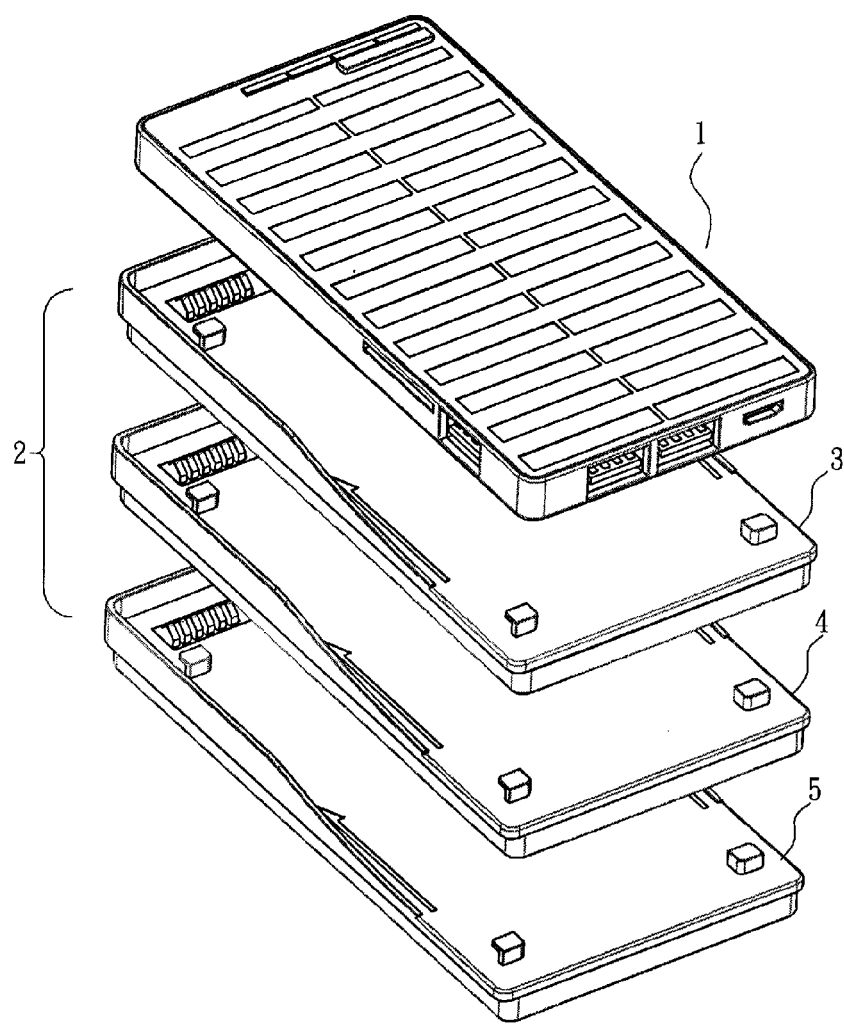
FIG. 8 is an exploded, perspective view showing the solar-powered charger and three cells to be assembled.
Figure 9:
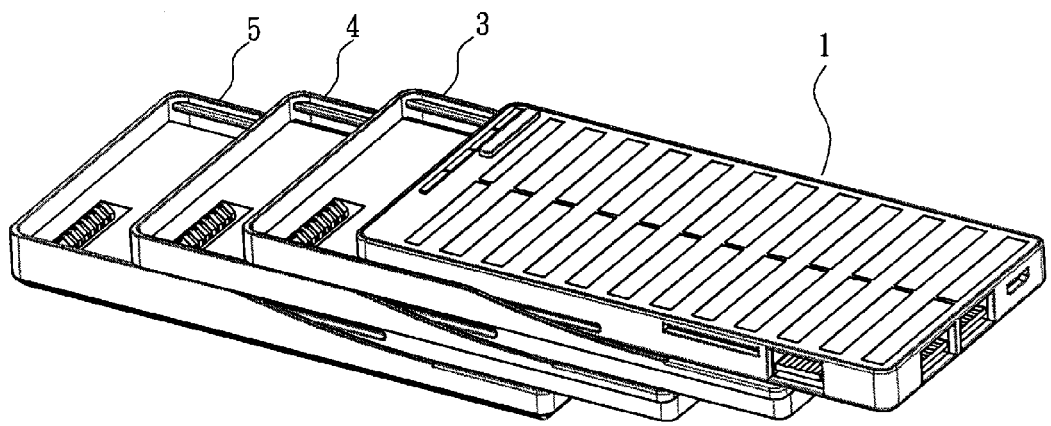
FIG. 9 is a perspective view of the solar-powered charger and the cells of FIG. 8 being partially assembled.
Figure 10:
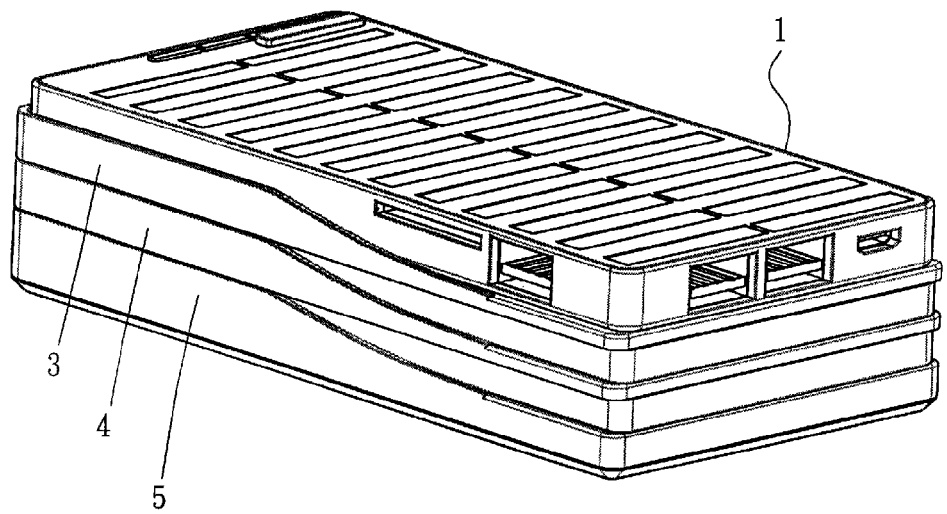
FIGS. 10 and 11 are perspective view of the assembled solar-powered charger and the cells viewing from different angles.
Figure 11:
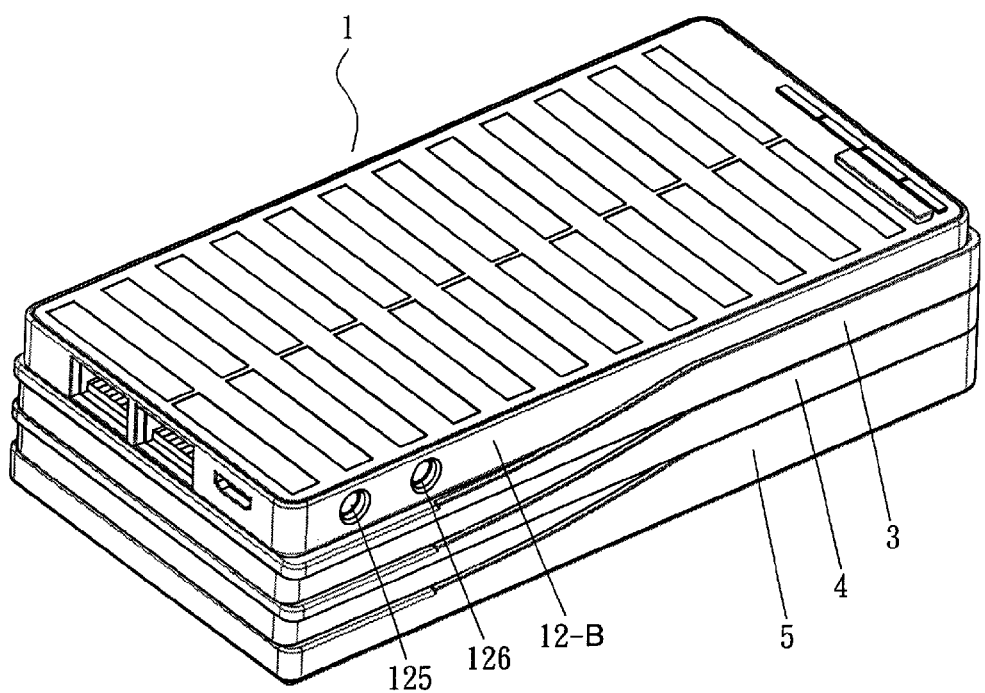

Referring to FIGS. 1 to 5, a portable solar power supply having one or more cells connected in series in accordance with the invention comprises a solar-powered charger 1 and a rechargeable battery 2. Each component is discussed in detail below.

The solar-powered charger 1 comprises a housing 11 and a circuit board 12 in the housing 11. On the circuit board 12, there are provided a power management unit 12A, a buck-boost converter unit 12B, a charging control unit 12C, and a data management unit 12D.

On the circuit board 12, there are further provided an on/off switch 121, a set of indicators 122, a power inlet 123, a power outlet 124, a power inlet jack 125, a power outlet jack 126, a solar cell 127, and a first connector 128 all of which being disposed on the housing 11.

On the circuit board 12, there are further provided a wireless communications member 12-A, a line transmission member 12-B, a data storage member 12-C, a radio frequency identification (RFID) member 12-D, a Secure Digital (SD) card member 12-E, a Universal Serial Bus (USB) port 12-F, a Micro USB port 12-G, a solar charging member 12-H, and a wireless charging member 12-I.

The SD card member 12-E, the USB port 12-F, and the USB port 12-G are disposed on the housing 11. The solar cell 127 is provided on a top surface of the housing 11 and electrically connected to the solar charging member 12-H. The first connector 128 is disposed on a bottom surface of the housing 11. A plurality of holes 13 are provided on four corners of the bottom of the rectangular housing 11.

Direct current (DC) power can be supplied to the solar-powered charger 1 by connecting an adapter (or a USB connector) to the power inlet 123 (or the power inlet jack 125). DC power can be supplied from the solar-powered charger 1 to a portable electronic device by electrically interconnecting the power outlet 124 (or the power outlet jack 126) and a power port of the portable electronic device. The SD card member 12-E is for insert of an SD card. The USB port 12-F and the Micro USB port 12-G are adapted to insert of a USB connector and a Micro USB connector respectively. The line transmission member 12-B is adapted to insert of an RJ-45 physical connector.

The power inlet 123 and the power inlet jack 125 are electrically connected to one end of the charging control unit 12C which has the other end electrically connected to one end of the power management unit 12A, one end of the solar charging member 12-H, and the wireless charging member 12-I respectively. The other end of the solar charging member 12-H is electrically connected to the solar cell 127. The other end of the power management unit 12A is electrically connected to the on/off switch 121, the set of indicators 122, the first connector 128 and one end of the buck-boost converter unit 12B respectively.

The other end of the buck-boost converter unit 12B is electrically connected to the data storage member 12-C, the RFID member 12-D, the SD card member 12-E, and the USB port 12-F respectively. The other end of the Micro USB port 12-G is electrically connected to the data management unit 12D. The wireless communications member 12-A and the line transmission member 12-B are electrically connected to the data management unit 12D.

The rechargeable battery 2 comprises a plurality of rectangular electrochemical cells 3, 4 and 5. For example, the cell 3 comprises a housing 31 with a rectangular cavity 32 formed on a top surface. On the cavity 32 there are provided with a control member 33, an electricity accumulator 34, a second connector 35, two projections 37, and two tabs 38. On the bottom surface of the cell 3, there are provided a third connector 36 below the second connector 35 and a plurality of slots 39 (e.g., four on four corners of the bottom of the cell 3 respectively). Each of the cells 3, 4 and 5 is shaped to be complementary to the solar-powered charger 1 and the cells 3, 4 and 5 are complementary each other so that they can be assembled as detailed later.

In an assembly, the projections 37 and the tabs 38 are adapted to insert into the holes 13 respectively so as to fasten the cell 3 and the solar-powered charger 1 together in a sliding and snapping manner. Likewise, the cells 3 and 4 can be fastened together by inserting the projections 37 and the tabs 38 of the cell 3 into the slots 39 of the cell 4 respectively in a sliding and snapping manner. The cells 4 and 5 can also be fastened together in such a manner. Moreover, the second connector 35 of the cell 3 is electrically connected to the second connector 128 of the solar-powered charger 1, the third connector 36 of the cell 3 is electrically connected to the second connector 35 of the cell 4, and the third connector 36 of the cell 4 is electrically connected to the second connector 35 of the cell 5 respectively. As a result, the solar-powered charger 1 and the cells 3, 4 and 5 are electrically connected in series. Further, the solar-powered charger 1 (i.e., the solar cell 127) can convert the energy of light directly into electricity to be stored in each of the cells 3, 4 and 5.

While the invention has been described in terms of preferred embodiments, those skilled in the art will recognize that the invention can be practiced with modifications within the spirit and scope of the appended claims.

What is claimed is:

1. A portable solar power supply comprising:
   a solar-powered charger comprising a solar cell; a circuit board including a power management unit, a buck-boost converter unit, a charging control unit, a data management unit, an on/off switch, a set of indicators, a power inlet, a power outlet, a first connector, a wireless communications member, a line transmission member, a data storage member, a radio frequency identification (RFID) member, a Secure Digital (SD) card member, a Universal Serial Bus (USB) port, a Micro USB port, and a solar charging member; and a plurality of holes; and
   a rechargeable battery comprising at least one electrochemical cell each shaped to partially contain the solar-powered charger and including a second connector, a third connector, a plurality of snapping members, and a plurality of slots;
   wherein the second connector is capable of connecting to either the first connector or the third connector, and the snapping members are capable of being retained in either the holes or the slots.

2. The portable solar power supply of claim 1, wherein the holes comprise four holes and the snapping members comprise two projections and two tabs.

3. The portable solar power supply of claim 1, wherein the solar cell is electrically connected to the solar charging member.

4. The portable solar power supply of claim 1, wherein the line transmission member is for insert of an RJ-45 physical connector.

5. The portable solar power supply of claim 1, wherein the power inlet is electrically connected to one end of the charging control unit which has the other end electrically connected to one end of the power management unit and one end of the solar charging member respectively; and the other end of the power management unit is electrically connected to the on/off switch, the set of indicators, the first connector, and one end of the buck-boost converter unit respectively.

6. The portable solar power supply of claim 1, wherein the other end of the buck-boost converter unit is electrically connected to the data storage member, the RFID member, the SD card member, and the USB port respectively; the other end of the Micro USB port is electrically connected to the data management unit; and the wireless communications member and the line transmission member are electrically connected to the data management unit.

* * * * *